(12) United States Patent
Pöyhönen et al.

(10) Patent No.: US 7,644,159 B2
(45) Date of Patent: Jan. 5, 2010

(54) LOAD BALANCING FOR A SERVER FARM

(75) Inventors: Petteri Pöyhönen, Helsinki (FI); Janne Tuononen, Helsinki (FI)

(73) Assignee: Nokia Corporation, Espoo (FI)

( * ) Notice: Subject to any disclaimer, the term of this patent is extended or adjusted under 35 U.S.C. 154(b) by 828 days.

(21) Appl. No.: 10/756,427

(22) Filed: Jan. 14, 2004

(65) Prior Publication Data

US 2004/0143662 A1 Jul. 22, 2004

Related U.S. Application Data

(63) Continuation of application No. PCT/FI02/00628, filed on Jul. 11, 2002.

(30) Foreign Application Priority Data

Aug. 15, 2001 (FI) .................................. 20011651

(51) Int. Cl.
*G06F 15/173* (2006.01)
(52) U.S. Cl. .................. 709/225; 709/224; 709/226
(58) Field of Classification Search .................. 709/225, 709/226, 224
See application file for complete search history.

(56) References Cited

U.S. PATENT DOCUMENTS

| | | | |
|---|---|---|---|
| 6,272,523 B1 | 8/2001 | Factor | |
| 6,415,323 B1* | 7/2002 | McCanne et al. | 709/225 |
| 6,611,872 B1* | 8/2003 | McCanne | 709/238 |
| 6,854,013 B2* | 2/2005 | Cable et al. | 709/226 |
| 7,155,515 B1* | 12/2006 | Brown et al. | 709/226 |
| 7,333,495 B2* | 2/2008 | Sala et al. | 370/395.21 |

FOREIGN PATENT DOCUMENTS

| | | |
|---|---|---|
| EP | 1 049 307 A1 | 11/2000 |
| WO | WO 98/57275 | 12/1998 |
| WO | WO 00/14633 | 3/2000 |
| WO | WO 00/14634 | 3/2000 |
| WO | WO 00/28433 | 5/2000 |
| WO | WO 01/39470 A1 | 5/2001 |
| WO | WO 01/40962 A1 | 6/2001 |
| WO | WO 01/52497 A3 | 7/2001 |

OTHER PUBLICATIONS

T. Narten, Neighbor Discovery for IP Version 6 (IPv6), RFC2461, Dec. 1998 [online]. Retrieved on Nov. 7, 2002 from the Internet at: http://www.faqs.org/rfcs/rfc2461.html.
Houssain et al, "Policy-Based Network Load Management", Bell Labs Tech. J., vol. 4, No. 4, Oct.-Dec. 1999, pp. 95-108.
Dave Thaler, Jun-Ichiro Itojun Hagino; *IPv6 Stateless DNS Discovery*;Network Working Group; Mar. 2002; 13 pages; The Internet Society.
T. Narten, E. Nordmark, W. Simpson; *Neighbor Discovery for IP Version 6 (IPv6)*; Network Working Group, Standards Track; Dec. 1998, 93 pages; The Internet Society.

* cited by examiner

*Primary Examiner*—Tonia L Dollinger
*Assistant Examiner*—Kyung H Shin
(74) *Attorney, Agent, or Firm*—Alston & Bird LLP (57) ABSTRACT

The present invention concerns a method of network layer load balancing for a server farm (group of servers located on the same link) that provide identical, transaction and UDP based services, e.g. DNS service. Load balancing functionality is based on the use of the IPv6 anycast addressing for the service queries and specific Neighbour Advertisement messaging.

34 Claims, 4 Drawing Sheets

Fig. 1

| Type | Code | Checksum |
|---|---|---|

| R | S | O | Reserved |
|---|---|---|---|

Target Address

Options...

LOAD BALANCING FOR A SERVER FARM

This is a Continuation of International Application No. PCT/FI02/00628 filed Jul. 11, 2002, which designated the U.S. and was published under PCT Article 21(2) in English.

FIELD OF THE INVENTION

The present invention relates to load balancing. In particular, the present invention relates to a novel and improved method for implementing network layer load balancing.

BACKGROUND OF THE INVENTION

The proliferation of servers for various tasks in the enterprise, e-commerce and Internet service provider domains has led to great scalability and manageability challenges. Today, most e-businesses deploy multiple servers devoted to Web, File Transfer Protocol (FTP), Domain Name Service (DNS), e-mail, secure socket layer and other such applications. However, although clustering has long held the promise of scalability and availability, it remains a distant dream and is very complex to configure and manage.

A server farm is a group of computers acting as servers housed together in a single location. A server farm is sometimes called a server cluster. A Web server farm is either (1) a Web site that has more than one server, or (2) an Internet service provider that provides Web hosting services using multiple servers. A server farm streamlines internal processes by distributing the workload between the individual components of the farm and expedites computing processes by harnessing the power of multiple servers. The farms rely on load balancing software that accomplishes such tasks as tracking demand for processing power from different machines, prioritising the tasks and scheduling and rescheduling them depending on the priority and the demand that users put on the network. When one server in the farm fails, another can step in as a backup. The servers are connected to at least one router. A router is a device or, in some cases, software in a computer that determines the next network point to which a packet should be forwarded toward its destination. The router is connected to at least two networks and it decides which way to send each information packet based on its current understanding of the state of the networks it is connected to.

Combining servers and processing power into a single entity has been relatively common for many years in research and academic institutions. Today, more and more companies are utilising server farms as a way of handling the enormous amount of computerisation of tasks and services that they require.

Load balancing is dividing the amount of work that a computer or processor has to do between two or more computers or processors so that more work gets done in the same amount of time and, in general, all users get served faster. Load balancing can be implemented with hardware, software, or a combination of both. Typically, load balancing is the main reason for computer server clustering.

Load balancing is also distributing processing and communications activity evenly across a computer network so that no single device is overloaded. Load balancing is especially important for networks where it is difficult to predict the number of requests that will be issued to a serverserver.html. Busy Web sites typically employ two or more Web servers in a load balancing scheme. If one server starts to get swamped, requests are forwarded to another server with more capacity. Load balancing can also refer to the communications channels themselves.

Load balancers support different load balancing techniques, which can be simple to set up and configure, yet powerful enough to use the full potential of all servers. Several load balancing or sharing methods are available, using common algorithms developed in studies of buffering and traffic distribution:

Round robin. Assigns connections sequentially among servers in a logical community.

Least connections. The server with the least number of connections gets the next connection.

Weighted distribution. Divides the load among the servers based on user-supplied percentage or weight.

Weighted methods can be used to ensure that high-performance servers receive more of the traffic load. That provides investment protection by leveraging existing servers along with powerful new servers.

Each server can also be set up for the maximum total number of connections it can handle to make sure it does not ever get overloaded. In the case of overflow or complete local server farm outage, the load balancer can send the requests transparently to remote backup servers or does an HTTP redirect to a remote server.

Server Farm load balancing is usually done above network layer by using more or less dedicated nodes (edge-servers etc.) that use specific signalling and algorithms to balance load between servers "behind" it. Simple Round robin algorithm is one that is used. More advanced edge-router solutions have also signalling between separate server farms (between edge-routers). The Internet-Draft "Analysis of DNS Server Discovery Mechanisms for IPv6" conveys the following solution for handling load balancing for DNS servers on network layer: "Regarding to the load balancing among DNS servers, If we need to implement a perfect load balancing among DNS servers (equal load onto each DNS servers), we should just put DNS servers onto a single IPv6 subnet. Neighbor discovery for anycast address should take care of it. Refer to [RFC 2461], section 7.2.7."

Actually, this solution more like "shares" the load, not balances it. A node responds to the Neighbour Solicitation message from its neighbor node by sending a randomly delayed Neighbour Advertisement message (based on RFC 2461). This means that there is no correlation between the most available server and the first responding server.

Reliable and optimized use of server farms in networks is a well-known problem. How to balance load of servers so that each server is doing its best and that the service servers are providing is robust and reliable. Various types of load balancing solutions are made to handle this problem. There are several drawbacks with the prior-art solutions. Load balancing is done above network layer, which requires specific signalling and dedicated nodes to do it. The prior art solutions are not standardized. Co-operation between different vendors' solutions is minimal, even non-existent. In the prior art solutions, servers usually need to be identical, in means of computing power.

SUMMARY OF THE INVENTION

The present invention is a method for network layer load balancing for a server farm system, wherein the server farm system comprises at least one router and two servers connected to each other with a communication link, the servers providing identical, transaction and UDP-based services, e.g. DNS service. Load balancing functionality is based on the use of the IPv6 anycast addressing for service queries and specific messaging from the servers. In a preferred embodiment, the messaging from the servers is Neighbour Advertisement messaging. A service specific IPv6 anycast address is configured to the server interfaces on the communication link.

In the present invention, the servers indicate preferably by Neighbour Advertisement messages (called here as ND proxy message) if they have capacity to offer services. When the router receives an ND Proxy message from some of its interfaces, it will update its neighbour cache entry of adverted Target Address by changing link-layer address of the entry to the adverted new link-layer address in the received ND Proxy message. This means that each time a server sends ND Proxy message, it will be the target for service queries until next ND Proxy message from some other server changes the entry again.

The invention also specifies some ND proxy message scheduling methods for the servers. To prevent too frequent ND Proxy message sending, each farm server must monitor ND Proxy messaging on the link and delay its own sending if necessary. Delaying ND Proxy sending is not in conflict with other requirements, because the sender is ready to receive queries and therefore it is reasonable for others to wait some minimum time before "taking turn from it". Although Neighbour Discovery (ND) protocol is the preferred protocol, also other suitable protocols can be used alternatively. One example of the protocol of this kind is the OSPFv6 protocol.

The advertisement message can also contain information about the service load in a server. Or, if OSPFv6 is used, route cost values. Based on this information, the router delivers the service queries.

The present invention has several advantages over the prior-art solutions. The present invention is a general solution that can be implemented in conformance with the standards approved by the Internet Engineering Task Force (IETF). It does not require any dedicated nodes, and needed load balancing related functionality is run in each farm server where needed resources are available. The router executes only normal routing. Because the present invention is working on the network layer, the load balancing is hidden inside the normal routing functionality.

The benefit of the present invention is that the load balancing functionality does not restrict the number of servers in the server farm. Moreover, the load balancing related functionality is done separately in each server, which means that servers do not have to be identical, in means of the computing power.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
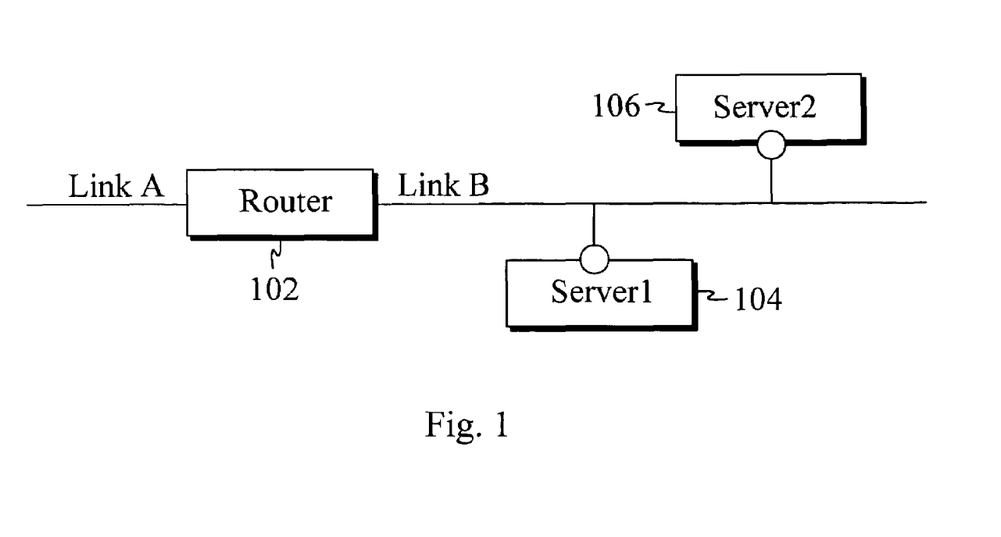
FIG. 1 is a block diagram illustrating a server farm structure according to one embodiment of the present invention, FIG. 2 describes a structure of the ICMP6 message format of Neighbour Advertisement message.

FIG. 1 represents one embodiment of a farm server system according to the present invention. The system comprises a router 102 connected to link A and link B. Also the server1 104 and server2 106 are connected to link B. The small circle in the servers means that a service-specific IPv6 anycast address is configured in them. The router 102 must support the IPv6 (including IPv6 anycast addresses). Although in FIG. 1 there are only two servers presented, the number of servers can be from 2 to N. The servers provide atomic, identical, transaction and User Datagram Protocol (UDP) based service (e.g. DNS service). The service can be any service, which fulfils the above-mentioned requirements and is a query-respond type of service.

All servers need to support the IPv6 (including IPv6 anycast addresses). Service-specific well-known site-scoped IPv6 anycast address is needed. Use of this address must be restricted only for the use of the service that the servers are providing (e.g. DNS).

There are some requirements in the configuration of the router and the servers:
  Service query must be atomic; i.e. it must be transmitted in one single packet.
  All service queries to the server1 104 and server2 106 are coming through the router 102.
  Service-specific IPv6 anycast address is used as the destination address in these service queries.
  Service-specific IPv6 anycast address is configured to the server interfaces on link B.

Figure 2:
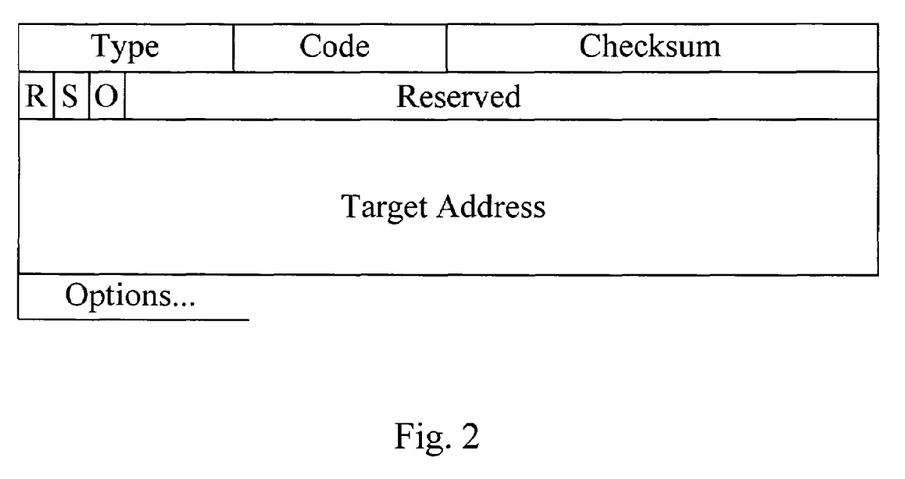

FIG. 2 describes the structure of the Internet Control Message Protocol version 6 (ICMPv6) message format for the ND Proxy message. The ND Proxy message allows a node (server) to inform its neighbours that the sender of the message is a proxy for some Target Address. IP packets to this Target Address should be sent to advertiser's link-layer address that can be found from the ND Proxy message.

The ND Proxy message is an Unsolicited Neighbour Advertisement message where override flag (O) is set. The Target Address is the address the sender is going to proxy, and Target's link-layer address option is set to the sender's link-layer address. When a router receives an ND Proxy message from some of its interfaces, it will update its neighbour cache entry of adverted Target Address by changing the link-layer address of the entry to the adverted new link-layer address in the received ND Proxy message. The remaining fields of the ND Proxy message are explained in more detail in the RFC 2461.

According to the RFC 2461 (section 7.2.5), entry update will take place, if the following requirements are fulfilled:
  Entry for the Target Address exists. Otherwise ND Proxy messages are discarded silently in the router.
  Entry is not in INCOMPLETE state. Otherwise ND Proxy messages are discarded silently in the router.
  Target's link-layer address in the received ND Proxy message is different from the one in the entry. If the link-layer address is the same, it means that the ND Proxy message is from the same server as the entry is pointing, and therefore update is not necessary.

Each time a server sends an ND Proxy message, it will be the target for the service queries until the next ND Proxy message from some other server changes the entry again.

Figure 3:
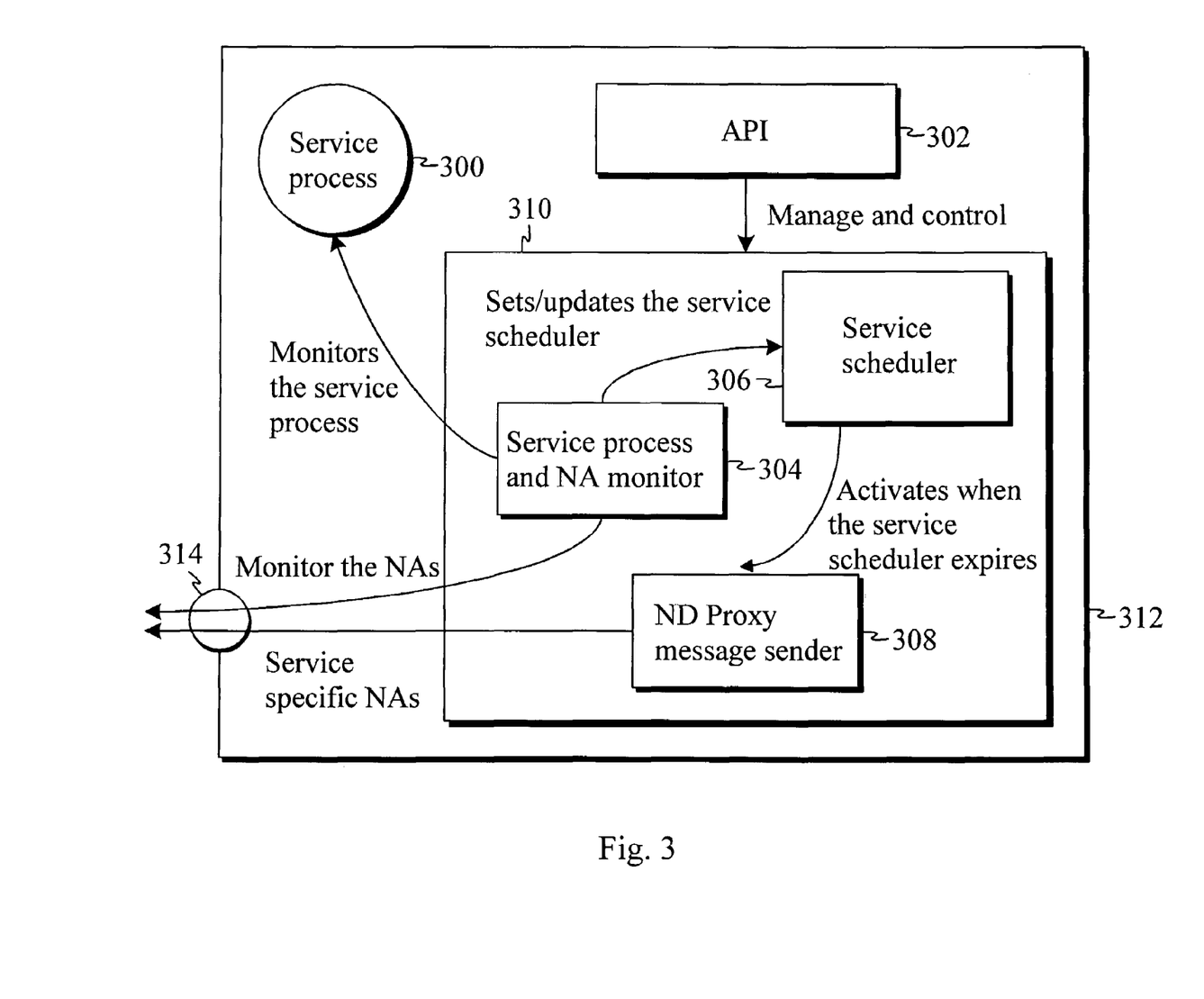
FIG. 3 is a block diagram illustrating the overall architecture of the scheduling mechanism of the sending of the advertisement messages with a server according to one embodiment of the present invention.

FIG. 3 represents a block diagram illustrating the overall architecture of the scheduling mechanism of the sending of the advertisement messages with a server. Proper scheduling functionality of the ND Proxy message sending in each farm server is crucial. If scheduling is done properly, load balancing is done automatically and the load of each farm server is relatively the same.

The service process 300 is the actual service (e.g., DNS service) the server is providing. The service process and the NA (Neighbour Advertisement message) monitor 304 monitors the service process 300 and the communication link through the service-specific anycast address configured in the interface 314. The Service scheduler 306 is updated by the Service process and the NA monitor 304. When the Service scheduler 306 expires (i.e. an ND Proxy message should be sent), it sends an activation message to the ND Proxy message sender 308. The ND Proxy message sender 308 sends the service-specific NAs when needed. The application interface 302 manages and controls the messaging unit 310.

To prevent too frequent ND Proxy messaging on the communication link, each farm server should monitor ND Proxy messaging on the link and delay its own sending if necessary. Delaying ND Proxy message sending is not in conflict with other requirements, because the sender is ready to receive queries and therefore it is reasonable for others to wait some minimum time before "taking turn from it".

The service process 300 and the NA monitor 304 that is enabled by the Service process 300 are the core of the scheduling system 312. Its responsibility is to set and update the Service scheduler 306 by interpreting information it gets from the Service process 300 and from the NAs received from the anycast link 314. When the scheduler expires, the ND Proxy message sender 308 sends a service-specific ND Proxy message to the link-local all-node multicast address (to all nodes on the link). When the Service process 300 stops for any reason, the ND Proxy messaging is stopped immediately.

Standard neighbour discovery address resolution functionality, done for service-specific anycast address, enables the ND proxy message sending functionality for the service in the servers. Normally, the address resolution is needed when required entry does not exist in the router's neighbour cache, because according to the standard (RFC 2461, section 7.2.5), the unsolicited NAs should not create new entries to the neighbour cache. The router executes the address resolution when the first packet destined to the service-specific anycast address is received. The outcome of the resolving is the required neighbour cache entry, after which the ND Proxy sending functionality is operative in the servers assuming that the service process 300 itself is running.

There are two possibilities why required service-specific anycast address entry doesn't exist in the router's neighbour cache:
1. The router has not initiated any communications with the Target earlier.
2. Entry for the Target Address in the neighbour cache in the router has expired.

The address resolution enables this load balancing scenario. Therefore, it is reasonable to start ND Proxy message sending (if the service process is running in the servers) only after the Neighbour Solicitation message for the service-specific IPv6 anycast address is received. On the other hand, if the servers are not receiving any service queries in some defined time, they should stop ND Proxy sending and switch to the standby mode. In the standby mode, the server listens the ND Proxy messaging and possible service-specific anycast address Neighbour Solicitation messaging on the link. When receiving one, ND Proxy message sending restarts.

All the Neighbour Discovery protocol functionality is executed automatically according to the protocol. The router does not have to include any special functions in addition to the normal routing functionality. The router sees the anycast address used in the invention as a normal unicast address. When the load balancing system is operating normally, that is, the servers are receiving service queries and the servers are responding to the queries, there is no need to send any ND protocol messages (an NS message) from the router to the servers. The router has a valid cache entry for the service-specific anycast address. The scheduled ND Proxy messages make sure that the cache entry will not expire in any case. If the cache entry should expire, a Neighbour Solicitation message would be required from the router because the next packet destined to the service-specific anycast address would arrive after the expiration of the cache entry.

When a service process (e.g. DNS) in a server is not active, the Neighbour Solicitation messages to the service-specific anycast address are discarded in the servers. The servers shall not respond to the service-specific anycast address related Neighbour Solicitation messages in any case if the service process is not active. If the router receives a respond from a server not running the service process, the router updates the cache entry, and the service queries are then sent to the server not running the service process.

When the service process is started and a server receives the first Neighbour Solicitation message from the router, the server responds to the Neighbour Solicitation message with a Solicited Neighbour Advertisement message and activates the ND Proxy messaging for the service-specific anycast address in question.

One way to do the Service process 300 monitoring is to monitor the socket interface the service is using. In more detail, to monitor the state of the receiving buffer of that socket interface. This makes the model service independent and very dynamic. For services where queries are atomic, this model is very usable and it makes it possible to have a monitor per socket interface, port, service etc.

Another possibility is to embed required monitoring functionality in the Service process 300 itself. This solution is not very dynamic because the monitoring functionality is divided between the kernel and the user space (NA monitoring must be done in kernel). Moreover, each service probably would require its own specific implementation. This kind of solution would require managed interface between kernel and user space (the service process is usually a user process).

Figure 4:
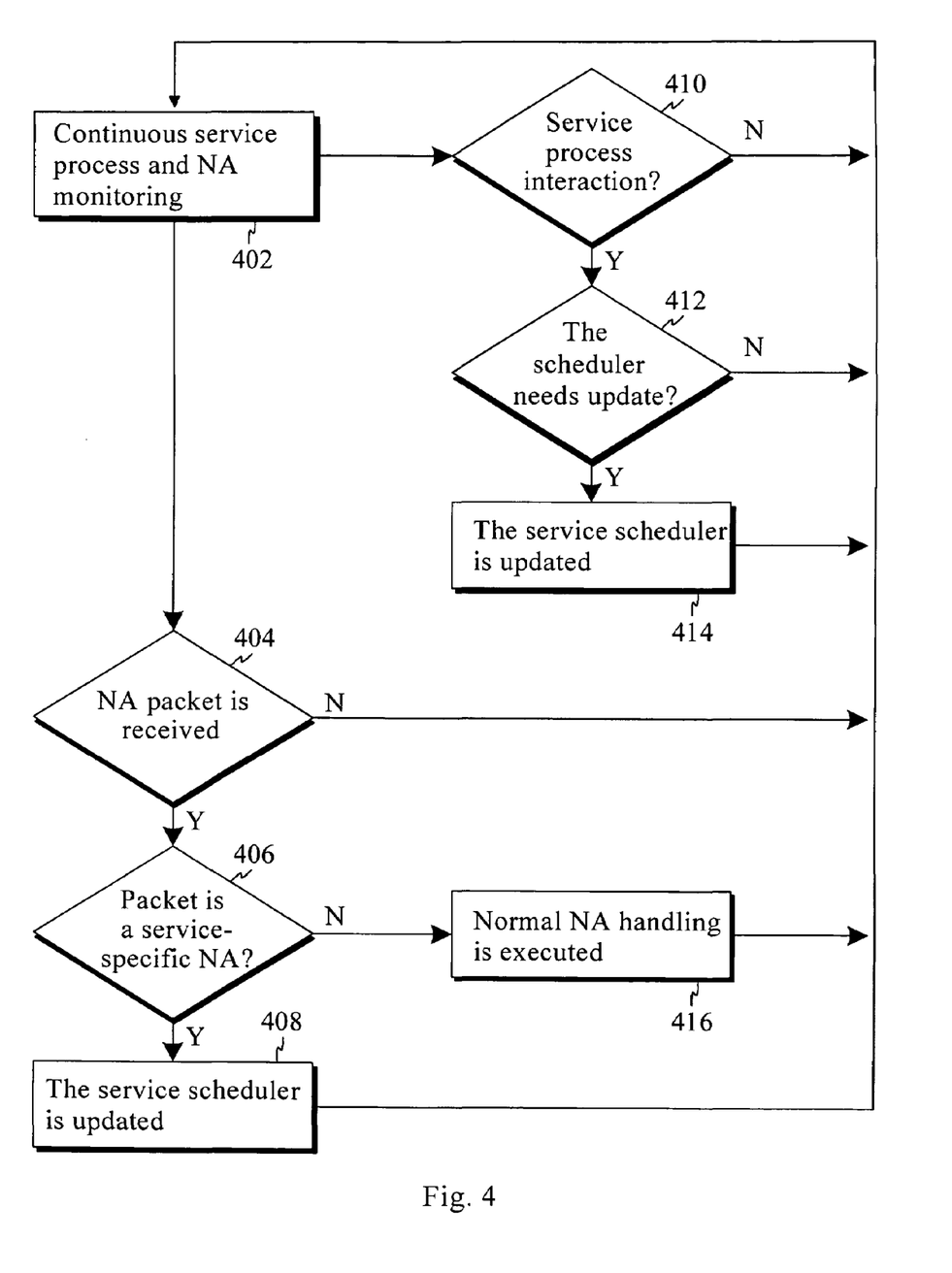
FIG. 4 is a flow diagram illustrating the service process and Neighbour Advertisement message monitoring functionality executed by a server of FIG. 1.

FIG. 4 is a flow diagram illustrating the service process and the Neighbour Advertisement message monitoring functionality executed by the scheduling system 312 of FIG. 3. The Service process and NA monitor 304 executes the monitoring continuously, as represented by the flow diagram box numbered 402. When the Service process 300 requires interaction, the positive outcome of the decision box 410 is taken. If the scheduler needs to be updated, the positive outcome of the decision box 412 is taken and the service scheduler is updated in box 414. If the scheduler does not have to be updated, the negative outcome of the decision box 412 is taken.

When an NA packet is received, the positive outcome of the decision box 404, it is determined if the packet is a service specific Neighbour Advertisement message. If it is not, the negative outcome of the decision box 406, normal NA handling is executed, as represented by the flow diagram box numbered 416.

If the packet is a service-specific NA, the positive outcome of the decision box 406, the Service scheduler 306 is updated, as represented by the flow diagram box numbered 408.

Figure 5:
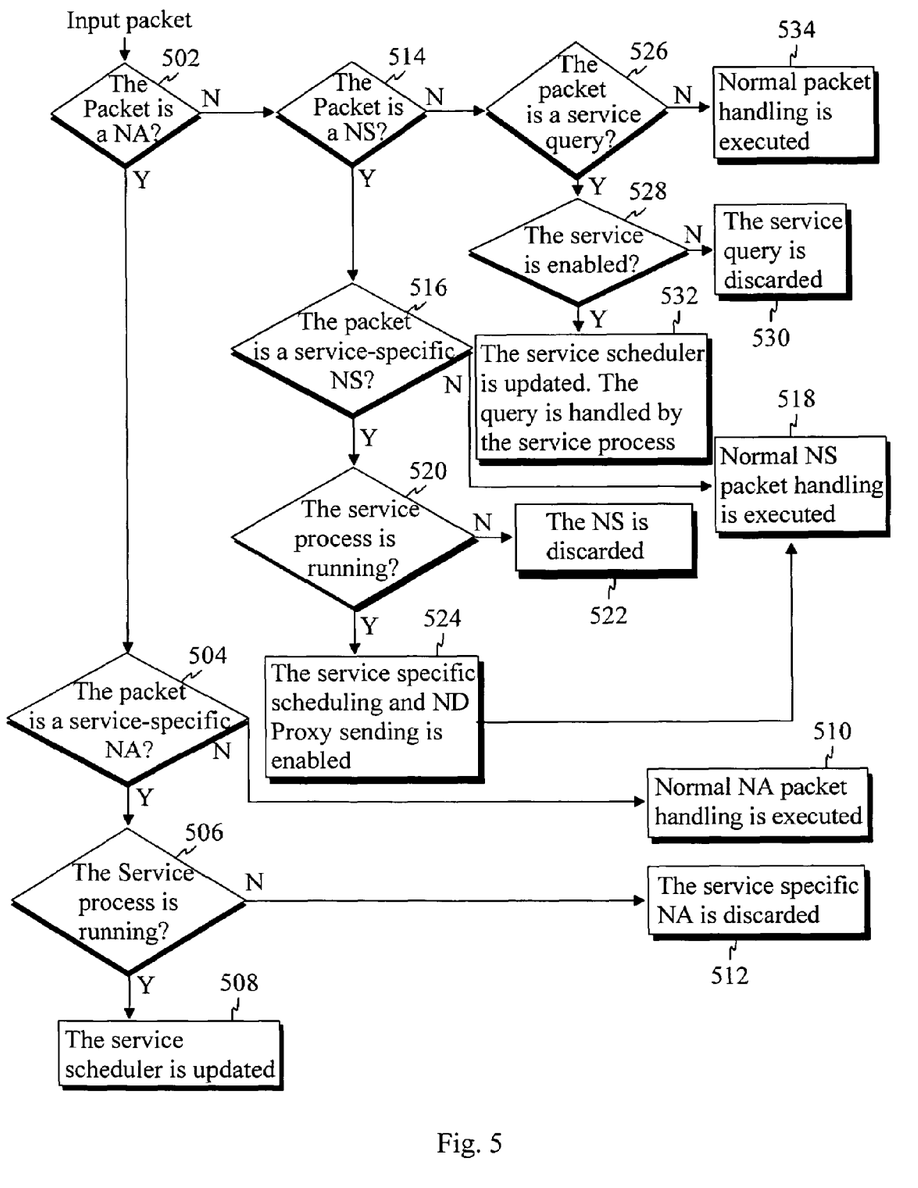
FIG. 5 is a flow diagram illustrating the input packet handling executed by a server of FIG. 1.

FIG. 5 is a flow diagram representing the input packet handling in a farm server. The flow diagram boxes 502-512 describe the same situation as described in FIG. 4 and are therefore not described in more detail.

In the decision box 514, it is decided whether the packet is a Neighbour Solicitation message (NS) or not. An NS message is sent when the router does not have a valid neighbour cache entry for the address destined to some of its links. If the packet is an NS packet, the positive outcome of the decision box 514, it is determined if the packet is a service-specific NS, as represented by the decision box numbered 516. If the packet is not a service specific NS, normal NS packet handling is executed, as represented by the decision box numbered 518. If the packet is a service specific NS, it is determined if the service process is running, as represented by the decision box numbered 520. If the service is down, the NS is discarded, as represented by the flow diagram box numbered 522. When the service process is running, the positive outcome of the decision box 520, service specific scheduling and ND Proxy sending is enabled, as represented by the flow diagram box numbered 524 and normal NS packet handling is executed.

When the packet is not an NS, it is determined if the packet is a service query, as represented by the decision box numbered 526. If the packet is not a service query, normal packet handling is executed, as represented by the flow diagram box numbered 534. If the packet is a service query, the positive outcome of the decision box 526, it is determined if the service is enabled, as represented by the decision box numbered 528. If the service is down or not available, the service query is discarded, as represented by the flow diagram box numbered 530. If the service is enabled, the positive outcome of the decision box 528, the service scheduler is updated and the query is handled by the service process, as represented by the flow diagram box numbered 532.

In one embodiment of FIG. 1, an alternative protocol is used instead of the Neighbour Discovery protocol. The alternative solution is based on use of the Open Shortest Path First for IPv6 (OSPFv6) routing protocol. The OSPFv6 protocol contains such features that it can be used instead of the ND protocol. The OSPFv6 protocol is defined in the RFC 2740. The OSPFv6 is an inter-domain link state routing protocol, where usability of some route is defined in "cost of the route" value. This "cost of route" is the key to the load balancing in the OSPFv6 model.

Philosophy of the load balancing in the OSPFv6 model differs largely from the one that is used in the ND model. While in the ND model a server "takes its turn", in the OSPFv6 model this capability is disabled and the final routing decision is made in the link router. The general idea in the OSPFv6 model is that the servers (now routers, because they run routing protocol in their interface(s)) manipulate the link router's routing table by advertising their virtual service anycast routes with route cost values suitable for the current situation. If traffic is too high, by increasing cost of the route and vice versa. The actual advertising is done by sending Link State Advertisements (LSA).

In the link router, the OSPFv6 processing runs periodically routing table recalculation. During the recalculation, cost values are compared against each other and the route having the lowest cost is put to the routing table. It is possible that two routes have equal cost values, when both routes are put into the routing table. Then the OSPFv6 protocol will automatically share packets evenly among them.

The OSPFv6 model becomes a load balancing system at that point when:
  1. The cost value of the service anycast route is determined from the state of the service process in a server.
  2. Route updates are sent to the link router from each farm server when needed.

There are some requirements for the OSPFv6 model. Both the link router and the service servers need to support the OSPFv6 protocol. Running a routing protocol (OSPFv6) in the service servers means that the servers must act as routers. Monitoring functionality in the OSPFv6 model monitors only the service process, because the servers are independent of each other.

In one embodiment of FIG. 1, it is possible to add more intelligence to the router. This would change the router's role in the system from a passive to an active load balancer. If the router is an active load balancer, delivering of the server load information to the router is crucial, otherwise the solution is more like a load sharing system. It is possible to add a new option to the NA message and deliver load information of some service(s) within the NA messages. In this solution, the router is an active load balancer, and functionality to interpret and handle this new server load option is needed. This solution has no restrictions as to whether the load information is delivered within a solicited or an unsolicited NA.

In one embodiment of FIG. 1, the router records all the NA messages and finds out that several interfaces are advertising the same anycast address. The router creates/have a cache for several link-layer addresses per neighbour cache entry and uses some type of traffic algorithm (e.g. Round robin) to deliver the queries to the servers in the farm so that the router actively balances the load between the servers. This solution requires the load information to be delivered from the servers to the router somehow, otherwise the router would just blindly deliver the queries without a capability to react on the low capacity in the servers. If the servers are delivering load info within the NA messages (by using an option or time-based NA messages) or some other way, the router can use this information to establish more sophisticated and dynamic traffic algorithms, and the load balancing becomes therefore more optimised.

In one embodiment of FIG. 1, the delivery of the service load information must be done one way or another if needed. A preferred solution for this is the time-based sending, which leaves "all the aces" to the server. Alternatively, a new service load option could be created to the NA message, and the information could be delivered to the router by using it. Naturally, router becomes "active" in this model.

In a broader scope, if the service load information is needed also elsewhere in the site, some other protocol than the ND is required to do the service load information delivery. The ND model is designed for separate and independent server farms, therefore being not scalable over the link at all. One possible solution to share the load information to other site routers is to run some standard routing protocol and define new server load options. This way, e.g. knowledge of service failure or congestion could reach the routing domain. A completely different possibility is to develop a whole new protocol to do the messaging between the servers and the routers.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:
1. A method, comprising:
providing a service with a service process in a server;
configuring a service-specific anycast address to a server interface on a communication link via which the server receives messages from a router or other servers;

monitoring the service process and the service-specific anycast address configured interface;

scheduling the service process and a need for an advertisement message, wherein the scheduling is configured to take advertisement messages received to the service-specific anycast address from other servers into account in determining the need for an advertisement message; and sending an advertisement message when the service process provides the service via the communication link to all other servers in response to the scheduling.

2. The method according to claim 1, wherein the sending of the advertisement message is activated by a solicitation message from the router.

3. The method according to claim 2, wherein neighbor discovery protocol is used, wherein said solicitation message is a neighbor solicitation message and said advertisement message is an unsolicited neighbor advertisement message wherein an override flag is set.

4. The method according to claim 1 further comprising:
delaying the sending of a new advertisement message.

5. The method according to claim 1, wherein if the server receives less than a predefined number of service queries in a predefined time interval, the method further comprises:
stopping the sending of the advertisement messages; and
switching to a standby mode.

6. The method according to claim 5, wherein if the server being in the standby mode receives a solicitation message, the sending of the advertisement messages continues.

7. The method according to claim 1, wherein when the service process in a server stops, sending of the advertisement messages is stopped.

8. The method according to claim 1, wherein open shortest path first version 6 protocol is used in communication between the router and the servers.

9. The method according to claim 1 further comprising:
sending an advertisement message with a route cost value suitable for the current situation in the server.

10. The method according to claim 9 further comprising increasing the route cost value if the server providing service is getting congested.

11. The method according to claim 9 further comprising decreasing the route cost value if the server providing service has capacity for new service queries.

12. The method according to claim 1, wherein the advertising message is an open shortest path first version 6 link state advertisement message.

13. The method according to claim 9 further comprising:
sending an advertisement message with service load information.

14. The method according to claim 1 further comprising delivering the service load information of the server with a separate protocol.

15. The method according to claim 1, wherein service is domain name system service.

16. An apparatus, comprising:
a service process configured to provide service on a communication link via which a server is configured to receive messages from a router or other servers;
a service-specific anycast address configured to a server interface on the communication link;
a processor configured to monitor said service process and the service-specific anycast address configured interface, and to schedule the service process and a need for an advertisement message, wherein the processor is configured to take into account in determining the need for an advertisement message advertisement messages received to the service-specific anycast address from other servers; and
a transmitter configured to send an advertisement message when the service process provides the service via the communication link to all other servers in response to the scheduling of the processor.

17. The apparatus to claim 16, wherein the transmitter is further configured to enclose service load information in the advertisement message.

18. The apparatus to claim 16, wherein the service in the server is the domain name system service.

19. The apparatus according to claim 16, wherein the advertisement message sending functionality in the server is configured to be activated by a solicitation message from the router.

20. The apparatus according to claim 19, wherein neighbor discovery protocol is used wherein said solicitation message is a neighbor solicitation message and said advertisement message is an unsolicited neighbor advertisement message where the override flag is set.

21. The apparatus according to claim 16, wherein the processor is further configured to delay the sending of a new advertisement message.

22. The apparatus according to claim 16, wherein if the server is not receiving any service queries in a predefined time interval, the server is configured to stop the sending of the advertisement messages and to switch to the standby mode.

23. The apparatus according to claim 22, wherein if the server being in the standby mode receives a solicitation message, the server is configured to continue the sending of advertisement messages.

24. The apparatus according to claim 16, wherein when the service process in a server stops, the server is configured to stop the sending of the advertisement messages.

25. The apparatus according to claim 16, wherein the open shortest path first version 6 protocol is used in the communication between the router and the servers.

26. The apparatus according to claim 16, wherein the transmitter is further configured to enclose a route cost value suitable for the current situation of the service process in the advertisement message.

27. The apparatus according to claim 26, wherein the server is configured to increase the route cost value if the service is getting congested.

28. The apparatus according to claim 26, wherein the server is configured to decrease the route cost value if the service has capacity for new service queries.

29. The apparatus according to claim 16, wherein the advertising message is an open shortest path first version 6 link state advertisement message.

30. A computer-readable storage medium encoded with instructions configured to control a processor to perform a process, the process comprising:
providing a service with a service process in a server;
configuring a service-specific anycast address to a server interface on a communication link via which the server receives messages from a router or other servers;
monitoring the service process and the service-specific anycast address configured interface;
scheduling the service process and the need for an advertisement message, wherein the scheduling is configured to take advertisement messages received to the service-specific anycast address from other servers into account in determining the need for an advertisement message; and sending an advertisement message when the service process provides the service via the communication link to all other servers in response to the scheduling.

31. An apparatus, comprising:

a service process configured to provide service on a communication link via which a server is configured to receive messages from a router or other servers;

a service-specific anycast address configured to a server interface on the communication link;

monitoring means for monitoring said service process and the service-specific anycast address configured interface;

service scheduling means for scheduling the service process and a need for an advertisement message, wherein the service scheduling means are configured to take into account in determining the need for an advertisement message advertisement messages received to the service-specific anycast address from other servers; and sending means for sending an advertisement message when the service process provides the service via the communication link to all other servers in response to the scheduling of the service scheduling means.

32. The apparatus to claim 31 further comprising means for enclosing service load information in the advertisement message.

33. The apparatus according to claim 31, wherein the service scheduling means are configured to delay the sending of a new advertisement message.

34. The apparatus according to claim 31, wherein the server comprises means for enclosing a route cost value suitable for the current situation of the service process in the server sending means in the advertisement message.

* * * * *

UNITED STATES PATENT AND TRADEMARK OFFICE
CERTIFICATE OF CORRECTION

PATENT NO. : 7,644,159 B2  Page 1 of 1
APPLICATION NO. : 10/756427
DATED : January 5, 2010
INVENTOR(S) : Pöyhönen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1122 days.

Signed and Sealed this

Sixteenth Day of November, 2010

David J. Kappos
*Director of the United States Patent and Trademark Office*